United States Patent
Uchiyama et al.

(10) Patent No.: US 10,374,269 B2
(45) Date of Patent: Aug. 6, 2019

(54) BATTERY PACK

(71) Applicant: DENSO CORPORATION, Kariya, Aichi-pref. (JP)

(72) Inventors: Masaki Uchiyama, Kariya (JP); Ryuichiro Shinkai, Kariya (JP); Yoshimitsu Inoue, Chiryu (JP); Takahiro Souki, Handa (JP); Kouhei Yamamoto, Inazawa (JP); Kouhei Yamaguchi, Takahama (JP); Tetsuya Goto, Tokoname (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/796,254

(22) Filed: Jul. 10, 2015

(65) Prior Publication Data
US 2016/0013526 A1    Jan. 14, 2016

(30) Foreign Application Priority Data
Jul. 11, 2014 (JP) ................................. 2014-143463

(51) Int. Cl.
*H01M 10/613* (2014.01)
*H01M 10/6568* (2014.01)
(Continued)

(52) U.S. Cl.
CPC ....... *H01M 10/613* (2015.04); *H01M 2/1094* (2013.01); *H01M 10/625* (2015.04);
(Continued)

(58) Field of Classification Search
CPC ........... H01M 10/613; H01M 10/6563; H01M 10/6568; H01M 10/647; H01M 10/653;
(Continued)

(56) References Cited

U.S. PATENT DOCUMENTS 5,756,227 A    5/1998  Suzuki et al.
9,306,251 B2 *  4/2016  Inoue .................. H01M 10/613
(Continued)

FOREIGN PATENT DOCUMENTS

CN    103987232    *  8/2014  ............... H05K 7/20
GB    2044430      * 10/1980  ............... F28F 13/12
(Continued)

OTHER PUBLICATIONS

UIO Chapter 8 Cen72367_ch08.qxd Nov. 4, 2004 {https://www.uio.no/studier/emner/matnat/math/MEK4450/h11/undervisningsmateriale/modul-5/Pipeflow_intro.pdf}.*
(Continued)

*Primary Examiner* — Jonathan G Leong
*Assistant Examiner* — Aaron J Greso
(74) *Attorney, Agent, or Firm* — Oliff PLC

(57) ABSTRACT

A battery pack includes a plurality of battery stacks integrated by stacking a plurality of unit batteries, a fluid passage where fluid flows for cooling the unit batteries disposed between the battery stacks, a blower for circulating the fluid in the fluid passage, and a plurality of heat conducting plates. The heat conducting plate is thermally connected to an outer casing of the unit batteries constituting the battery stacks adjacent to each other, and disposed so as to constitute a plurality of cooled portions of which parts thereof exist in the fluid passage. The battery pack includes a passage forming member that demarcates the fluid passage as an independent passage from the area near the outer casing of the unit battery, and includes a partition wall for supporting the heat conducting plate.

5 Claims, 10 Drawing Sheets

(51) Int. Cl.
*H01M 10/6563* (2014.01)
*H01M 10/6555* (2014.01)
*H01M 10/6552* (2014.01)
*H01M 10/653* (2014.01)
*H01M 10/647* (2014.01)
*H01M 2/10* (2006.01)
*H01M 10/625* (2014.01)

(52) U.S. Cl.
CPC ....... *H01M 10/647* (2015.04); *H01M 10/653* (2015.04); *H01M 10/6552* (2015.04); *H01M 10/6555* (2015.04); *H01M 10/6563* (2015.04); *H01M 10/6568* (2015.04); *H01M 2220/20* (2013.01)

(58) Field of Classification Search
CPC ......... H01M 10/6552; H01M 10/6555; H01M 10/625; H01M 2/1094; H01M 2220/20
See application file for complete search history.

(56) References Cited

U.S. PATENT DOCUMENTS

| | | | | |
|---|---|---|---|---|
| 2005/0092475 A1* | 5/2005 | Ambros | ............. | F01P 7/14 165/177 |
| 2007/0031728 A1* | 2/2007 | Lee | ............. | H01M 2/1061 429/120 |
| 2008/0121380 A1* | 5/2008 | Shimoyama | ............. | F28F 1/12 165/121 |
| 2010/0330408 A1* | 12/2010 | Yoon | ............. | H01M 2/0262 429/120 |
| 2011/0059347 A1* | 3/2011 | Lee | ............. | B60L 11/18 429/120 |
| 2011/0189521 A1* | 8/2011 | Lee | ............. | H01M 2/1077 429/120 |
| 2014/0030561 A1 | 1/2014 | Yoon et al. | | |

FOREIGN PATENT DOCUMENTS

| | | | | |
|---|---|---|---|---|
| JP | H08148187 | A | 6/1996 | |
| JP | 2004031281 | A | 1/2004 | |
| JP | 2005-302698 | * | 10/2005 | ............. B60K 11/06 |
| JP | 2005302698 | A | 10/2005 | |
| JP | 2007012486 | A | 1/2007 | |
| JP | 2009211829 | A | 9/2009 | |
| JP | 2011503794 | A | 1/2011 | |
| JP | 5119727 | B2 | 1/2013 | |
| JP | 2014-112479 | A | 6/2014 | |

OTHER PUBLICATIONS

English Machine Translation and DERWENT for CN 103987232 dated Aug. 2014.*

* cited by examiner

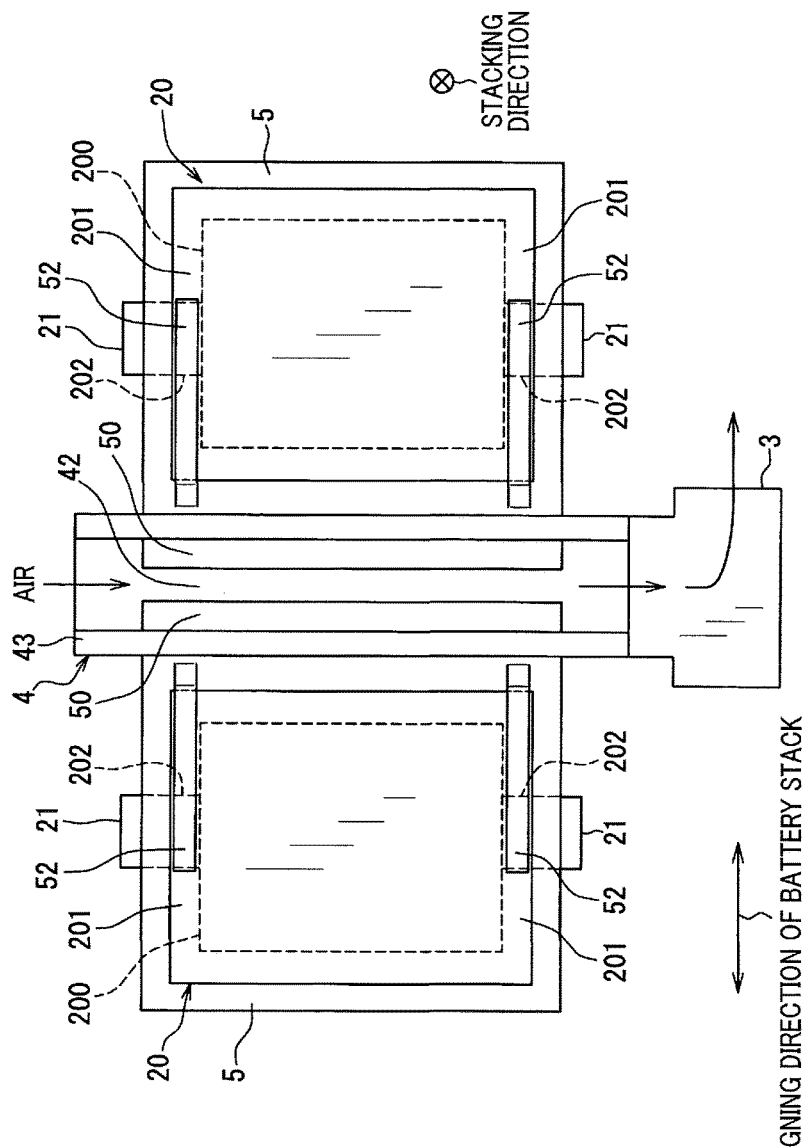

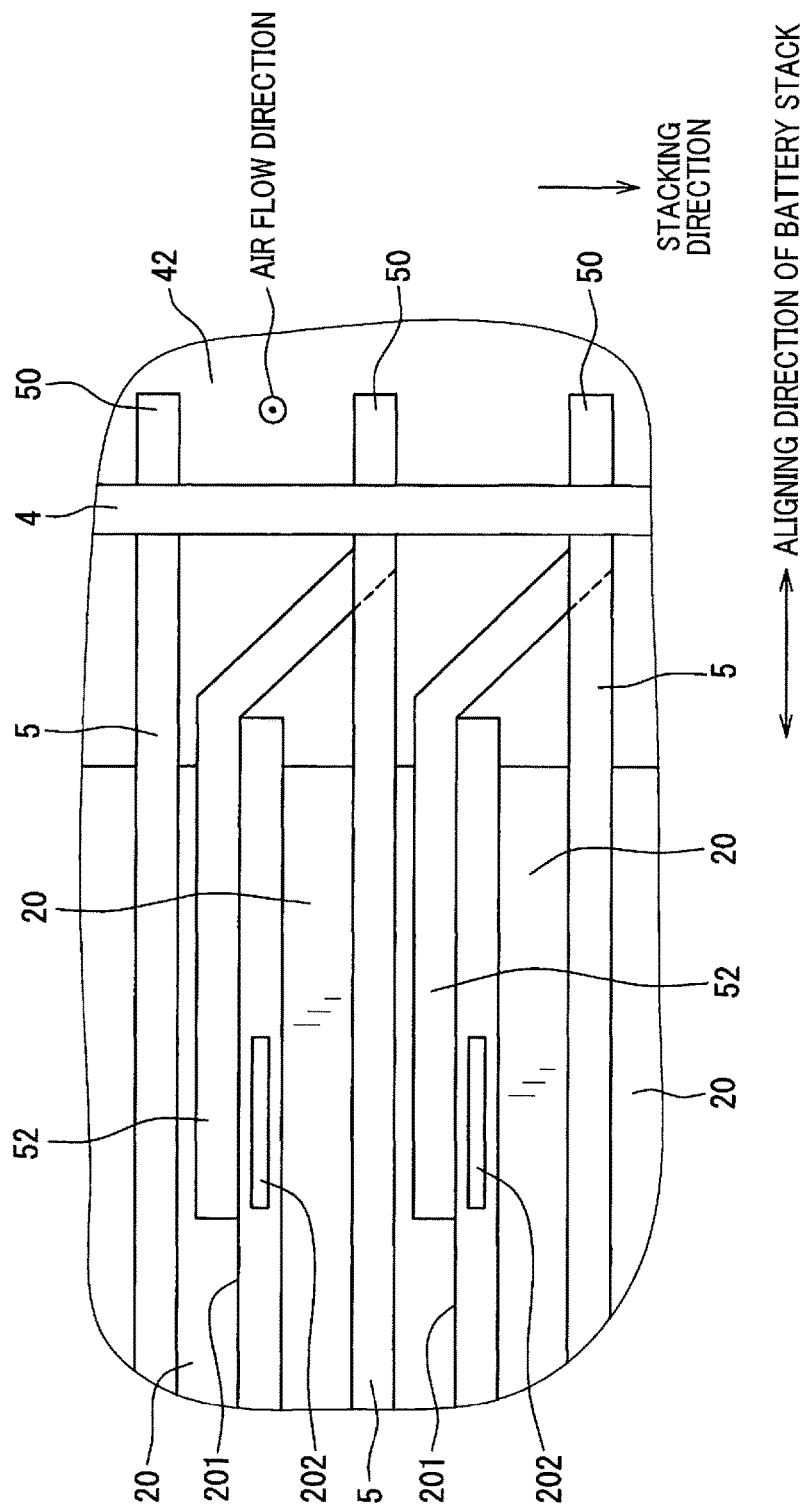

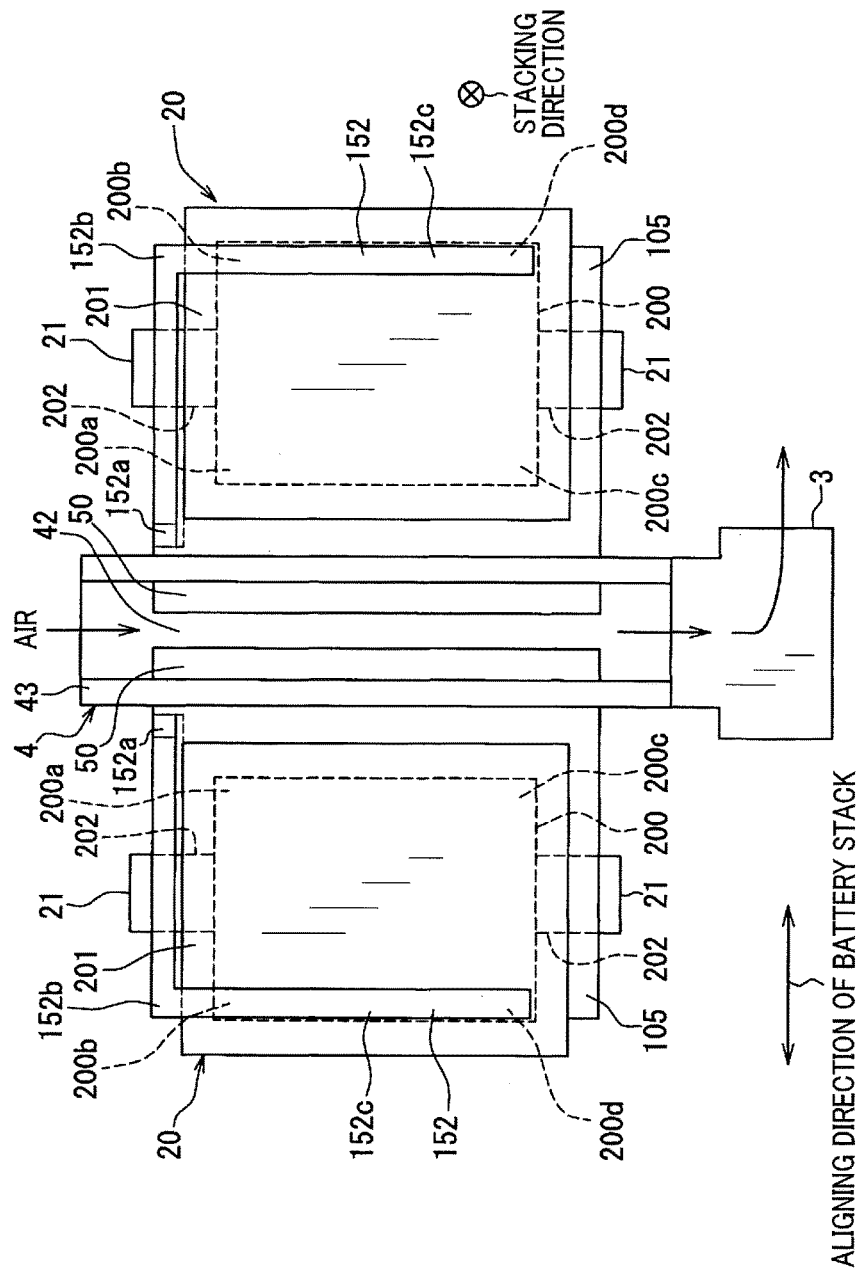

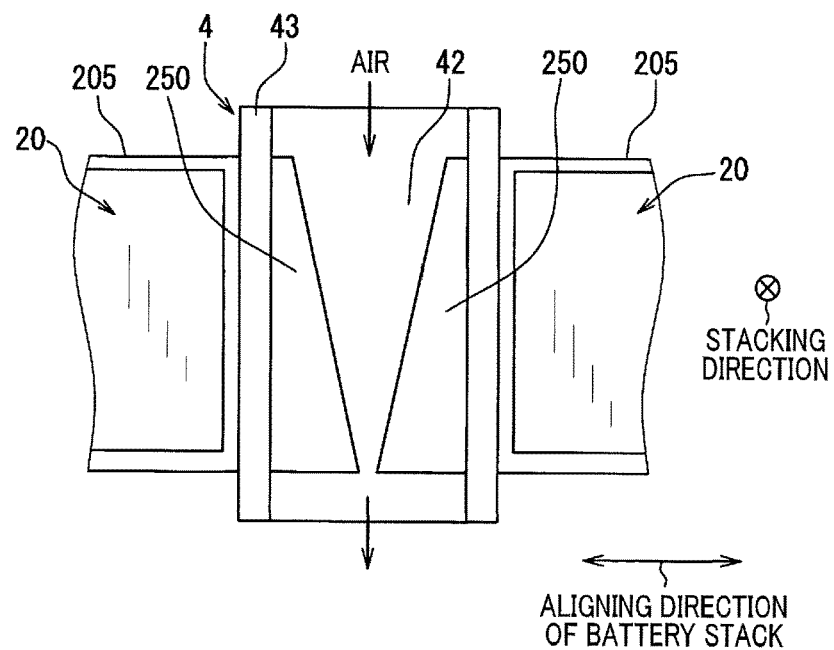
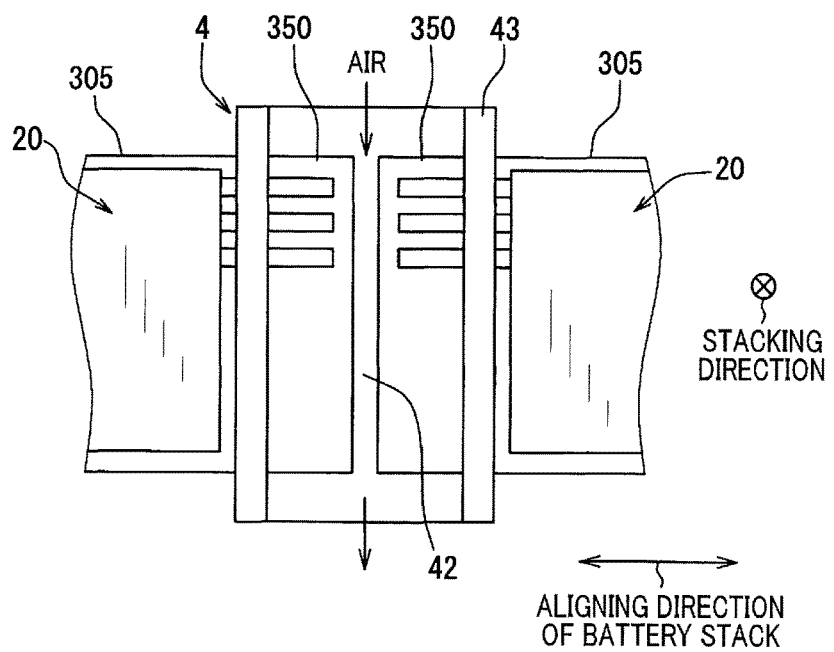

BATTERY PACK

CROSS-REFERENCE TO RELATED APPLICATION

This application is based on and claims the benefit of priority from earlier Japanese Patent Application No. 2014-143463 filed Jul. 11, 2014, the description of which is incorporated herein by reference.

TECHNICAL FIELD

The present disclosure relates to a battery pack including a plurality of battery stacks formed integrally by stacking a plurality of unit batteries.

BACKGROUND

Japanese Patent Publication No. 5119727 discloses a battery pack disposed in a case so as to provide battery stacks formed integrally by stacking pouch cells in a thickness direction in a plurality of rows in a longitudinal direction of the battery with spaces therebetween.

The battery pack includes cooling air passages extending in a direction perpendicular to a column direction between the adjoining battery stacks.

The cooling air passages are adapted so that cooling air introduced by a cooling air introducer flows.

Further, the cooling air is configured to contact only on electrode tabs connected to positive terminals or negative terminals of the battery, and on portions of the battery where the electrode tabs are disposed.

Since it is not necessary to ensure the cooling air passage where the cooling air flows in the substantially entire periphery of the battery, it is possible to reduce the size of the battery pack according to the structure of the battery pack disclosed in the Publication No. '727.

However, it is clear that the cooling air contacts the battery body positioned in a side where the electrode tabs are disposed, and it is further clear that surroundings of the battery body and the cooling air passage are in relationship that is physically communicating.

Thus, when gas generated inside the battery is leaked from the battery body, for example, the gas is likely to flow into the cooling air passage.

There is a problem that the gas flowing into the cooling air passage may, for example, be discharged out of the battery pack together with the cooling air, or when the cooling air is not flowing, the gas may be discharged from a place where the cooling air is introduced.

Thus, outflow of the gas may become expanded through the cooling air passage, and it can be assumed that a problem may be caused by the expansion of the gas.

SUMMARY

An embodiment provides a battery pack that suppresses gas from expanding when the gas is generated from a battery, while provides a fluid passage having a function of supporting the battery.

A battery pack according to a first aspect includes a plurality of battery stacks integrated by stacking a plurality of unit batteries, and a fluid passage, where fluid flows for cooling the unit batteries, disposed between the battery stacks, which are disposed adjacent to each other in a direction perpendicular to a stacking direction.

The battery pack further includes a fluid driver for circulating the fluid in the fluid passage, and a plurality of heat conducting members thermally connected at least to one of an outer casing or an electrode terminal of the unit batteries constituting the battery stacks adjacent to each other and disposed so as to constitute a plurality of cooled portions of which parts thereof exist in the fluid passage.

The battery pack further includes a passage forming to member that demarcates the fluid passage as an independent passage from the area near the outer casing of the unit battery, and includes a partition wall for supporting the heat conducting members.

According to the present disclosure, it is possible to separate spaces by the passage forming member where the unit battery exists and the fluid passage where the cooling fluid flows.

Thus, even if gas leaks from the unit batteries to the surroundings, for example, the gas can be prevented from being mixed in the fluid flowing through the fluid passage and diffusing to other places.

Further, by supporting the plurality of heat conducting plates using the partition walls of the passage forming member, the resistance against vibration can be enhanced even in a situation where the unit battery vibrates.

According to the present disclosure, the battery pack suppresses gas from expanding when the gas is generated from the unit battery, and provides the fluid passage having a function of supporting the unit battery.

BRIEF DESCRIPTION OF THE DRAWINGS

In the accompanying drawings:

FIG. 4 shows a plan view of a relationship between a heat conducting plate and a unit battery in the battery pack of the first embodiment;

FIG. 5 shows a partially enlarged front view to describe the relationship between the heat conducting plate and the unit battery according to the first embodiment;

FIG. 6 shows a plan view of a relationship between a heat conducting plate and a unit battery in the battery pack of a second embodiment;

FIG. 7 shows a plan view of a relationship between a heat conducting plate and a cooling air passage of a third embodiment;

FIG. 8 shows a plan view of a relationship between a heat conducting plate and a cooling air passage of a fourth embodiment;

DETAILED DESCRIPTION OF THE PREFERRED EMBODIMENTS

Figure 1:
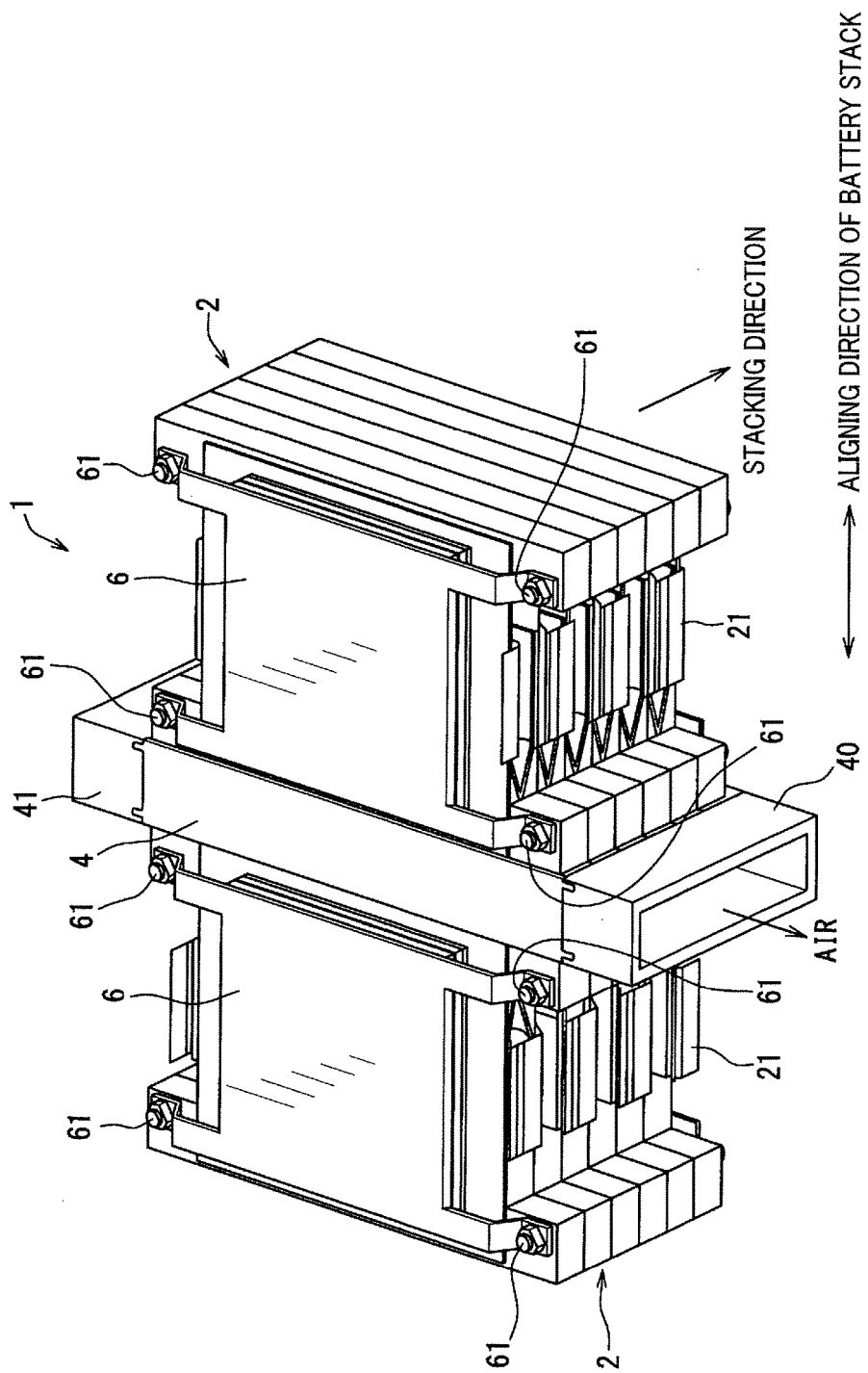
FIG. 1 shows a perspective view of an outline of a battery pack according to a first embodiment to which the present disclosure is applied.

Embodiments according to the present disclosure will be described with reference to drawings.

In each embodiment, corresponding parts to matters described in a preceding embodiment will be denoted by the same reference numerals and may be omitted from redundant explanation.

When only a part of the configuration is described in each embodiment, the other parts of the configuration can be applied to other embodiments described earlier.

Not only the combinations that are clearly specified as possible combinations in the embodiments, but also parts of different embodiments can be combined together even if not specified as long as no trouble occurs in the combination.

First Embodiment

A first embodiment to which a battery pack according to the present disclosure is applied will be described with reference to FIGS. 1-5.

A battery pack 1 includes a plurality of battery stacks 2 that are integrated by stacking a plurality of unit batteries 20 that are conductively connected.

The battery pack 1 can be used for an electric vehicle (EV) that travels only by an electric motor, a vehicle storage battery mounted on a plug-in hybrid vehicle (PHV) that uses an electric motor and an internal combustion engine together as a driving force, or can be used as a stationary storage battery for a storage battery in a house, for example.

The unit battery 20 is a thin secondary battery having a flat exterior.

A lithium ion secondary battery, for example, can be used as the unit battery 20.

The unit battery 20 has a flat rectangular shape and an outer peripheral surface thereof is covered by a covering material made of an electrically insulating resin, for example.

A plan view shape of the unit battery 20 is a rectangular shape, and the unit battery 20 is a flat plate-like body having a thickness thinner than vertical and horizontal dimensions of the rectangular shape.

The unit battery 20 may be configured by a pouch cell that has an outer casing formed of laminated films.

The unit battery 20 includes a main body portion 200 having power generating elements (not shown) therein, and a sealing portion 201 formed by laminating the laminate films and has a shape further protruding from at least one pair of opposing sides of the main body portion 200.

The main body portion 200 is internally has the power generating elements such as a positive electrode including a positive active material, a negative electrode including a negative active material, an electrolyte, and a separator.

The positive electrode is electrically connected to a positive terminal that is one of the electrode terminals 202, and the negative electrode is electrically connected to a negative terminal that is one of the electrode terminals 202.

An exterior of the main body portion 200 and the sealing portion 201 is formed of the laminate films having flexibility.

The main body portion 200 is a portion that contacts directly or indirectly to a main body portion of the adjacent unit battery 20 in the battery pack 1, and has a larger thickness as compared to the sealing portion 201.

The sealing portion 201 is provided in whole or in part in an outer periphery of the unit battery 20 by the laminate films being bonded thereto by heat welding, for example.

The sealing portion 201 is formed by sealing each ends of the laminated films by heat sealing each ends, for example, and contributes to a formation of a sealed inner space in the battery.

The sealing portion 201 is formed in a predetermined width to the entire periphery of the outer casing of the unit battery 20.

The two electrode terminals 202 consist of the negative terminal and the positive terminal protrude from both ends of the outer casing of the unit battery 20.

Protruding directions of the negative terminal and the positive terminal (hereinafter, collectively, may be referred to as the electrode terminals 202) are directions perpendicular to a thickness direction of the unit battery 20.

The electrode terminals 202 are plate-like terminals, and are supported by being sandwiched by the sealing portion 201.

The sealing portion 201 stably supports the electrode terminals 202.

The negative terminal is disposed so as to protrude in a predetermined length from an outer peripheral edge of the sealing portion 201 extending from one of the opposing sides.

The positive terminal is disposed so as to protrude in a predetermined length from the outer peripheral edge of the sealing portion 201 extending from the other one of the opposing sides.

Each electrode terminal 202 is conductively connected to each electrode tab 21.

A plurality of unit batteries 20 constituting the respective battery stack 2 are connected in series by the electrode tabs 21.

A plurality of battery stacks 2 constituting the battery pack 1 are conductively connected by terminals (not shown).

All of the positive terminals and the negative terminals positioned in both ends of the plurality of battery stacks 2 are connected to a main relay or the like that turns on and off the electric conduction to the battery pack 1, and are terminals to which power is supplied from an external, or terminals that discharge toward other electrical equipment.

The laminate film is, for example, a sheet formed by laminating an aluminum layer and a polypropylene layer alternately.

Surface layers of both ends in the thickness direction of the laminate film are the polypropylene layers, and the laminate films are bonded to each other by thermally welding the polypropylene layers.

Furthermore, the polypropylene layer may optionally be a polyethylene layer or a polyethylene terephthalate layer.

Further, the configuration of the battery pack 1 will be described.

Figure 2:
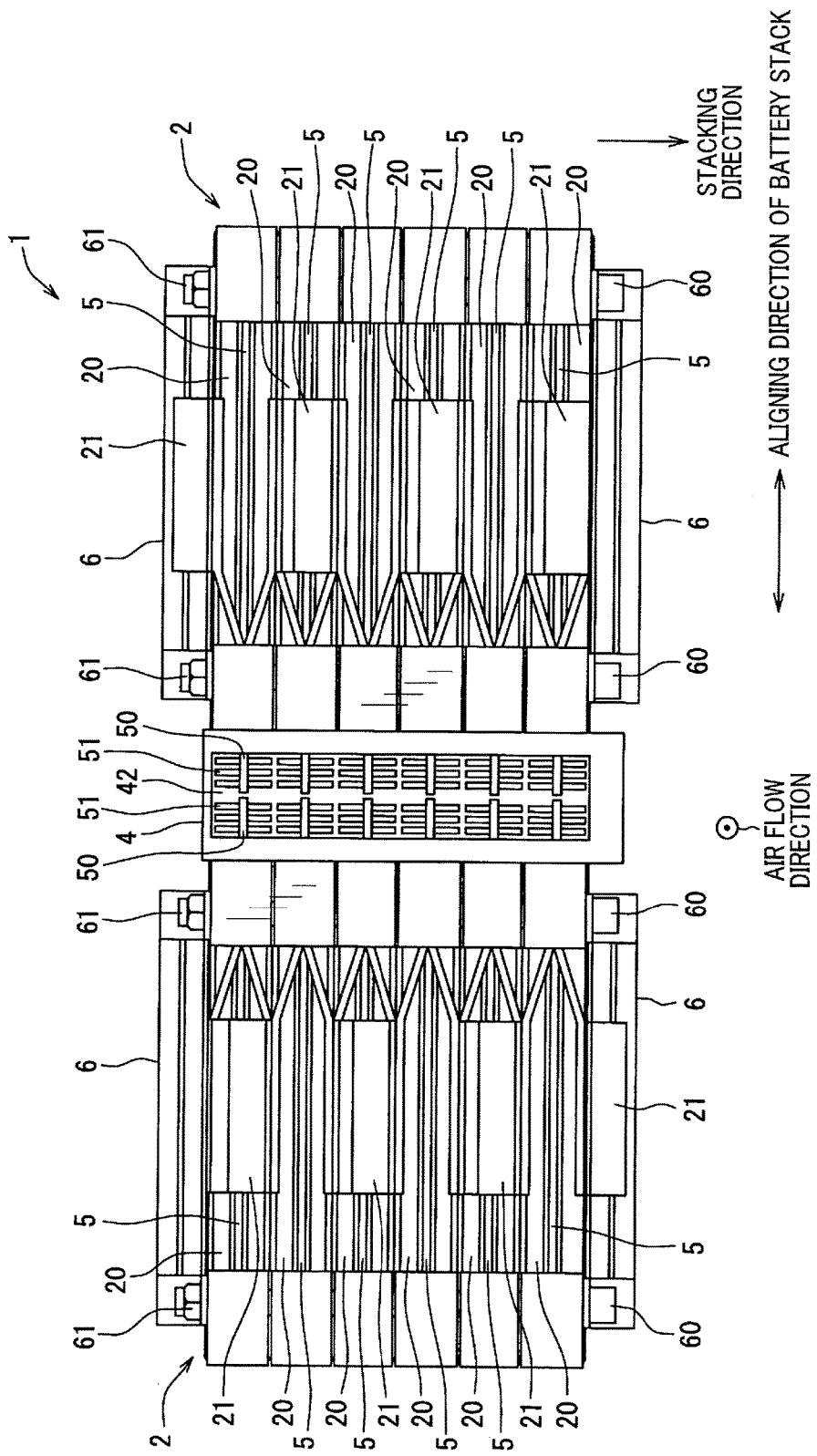
FIG. 2 shows a front view of the outline of the battery pack according to the first embodiment.
Figure 3:
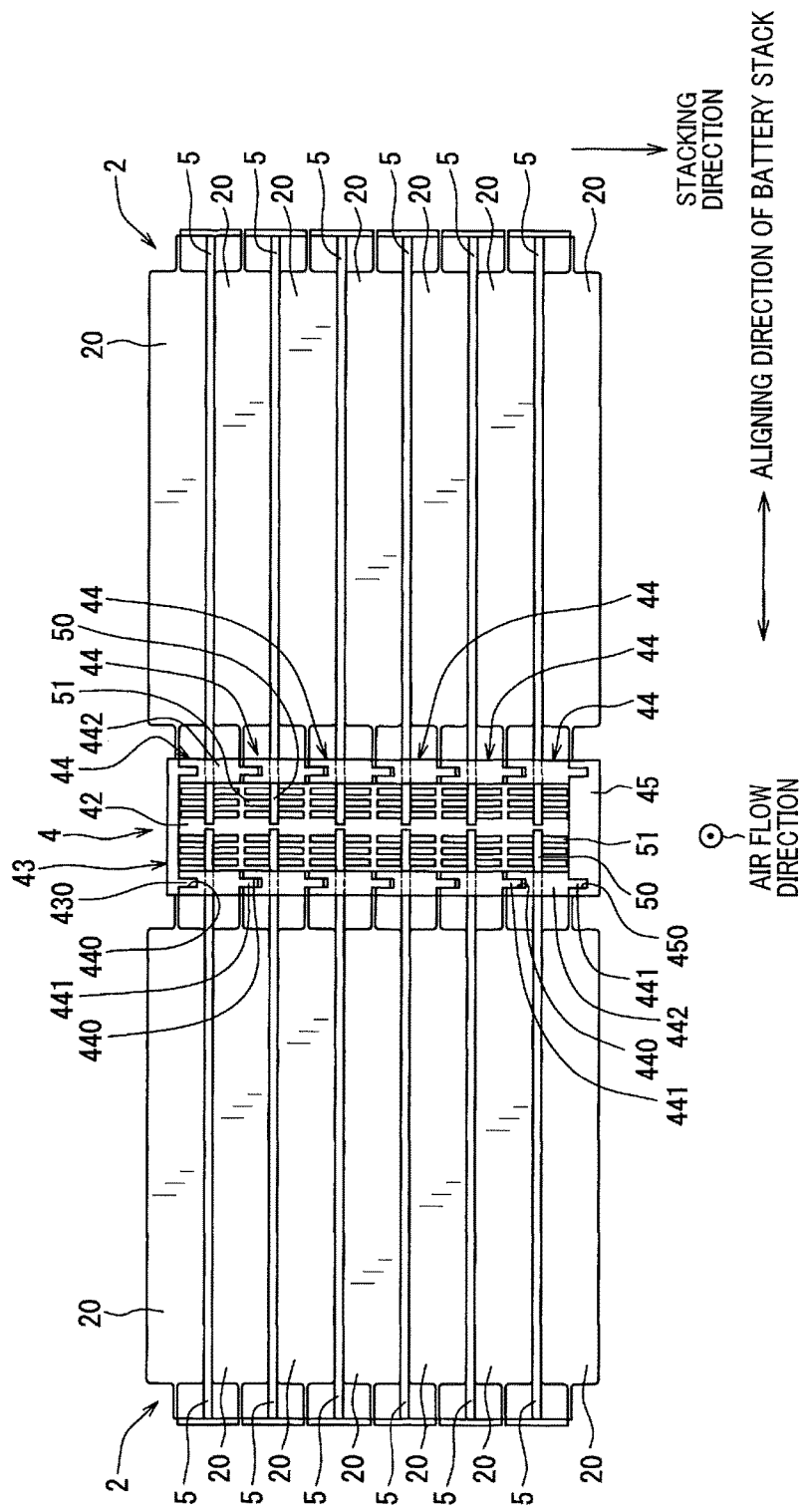
FIG. 3 shows a front view of the battery pack of FIG. 2 in a state where a connecting member, etc. for being connected to a blower is removed.

As shown in FIGS. 1-3, battery pack 1 includes the plurality of battery stacks 2, heat conducting plates 5, a passage forming member 4, end plates 6, a restraining member that applies force in a compressing direction to the end plates 6, or the like.

The restraining member with a fastening structure using a bolt 60 and a nut 61 narrows an interval between a pair of end plates 6, and restrains them by compressing the plurality of unit batteries 20 constituting the single battery stack 2.

Four restraining members are provided respectively to the outside of both ends of each battery stack 2.

A columnar portion composed of a plurality of spacer members where the bolt 60 is inserted is constituted in each point positioned in four corners.

Each bolt 60 is a rod-shaped member having a shaft portion longer than the length of a combination of the pair of end plates 6 and the battery stack 2 in the thickness direction thereof.

The bolt 60 has a head larger than the shaft portion at one end, and has a male thread portion of a predetermined axial length at another end.

Through holes where the shaft portions of the bolts 60 are inserted respectively are disposed at the four corners of the pair of end plates 6.

By gradually tightening the nut 61 to compress so as to narrow the interval between the end plates 6 at both ends, the compression force acts on the plurality of stacked unit batteries 20 and the heat conducting plates 5.

At least two of the battery stacks 2 are disposed adjacent to each other in a direction perpendicular to the stacking direction of the unit batteries 20.

A fluid passage 42 where fluid flows for cooling the unit batteries 20 constituting the respective battery stack 2 is formed between the pair of the battery stack 2 disposed adjacent to each other in a manner mentioned above.

The fluid passage 42 is a passage formed in an interior of the cylindrical passage forming member 4.

The battery pack 1 includes a fluid driver for forcibly circulating the cooling fluid in the fluid passage 42.

The fluid may be either a gas or liquid as long as it is a heating medium that can absorb heat from the heat conducting plate 5 by contacting with the heat conducting plate 5 existing in the fluid passage 42.

As for the heating medium, air, water, oil, carbon dioxide, or a refrigerant such as a fluorine-based medium can be used, for example.

A blower 3 is an example of a fluid driver for driving air as a heating medium.

The blower 3 includes a motor, a sirocco fan rotated by the motor, and a fan casing incorporating a sirocco fan (not all are shown).

The fan casing includes an intake section communicated to an intake port of the sirocco fan, and a discharge section that discharges the air sucked from the intake section in an axial direction of the fan by blowing in a centrifugal direction (not all are shown).

The blower 3 is connected to the passage forming member 4 that demarcates a fluid passage 42 via a connecting member 40.

The connecting member 40 is a duct for connecting a downstream end of the passage forming member 4 and the intake section of the blower 3.

Another connecting member 41 is connected to an upstream end of the passage forming member 4.

The connecting member 41 is connected to a location that does not communicate with a surrounding of the outer casing of the unit battery 20.

The connecting member 41 is a duct for connecting the upstream end of the passage forming member 4 and a source of cooling air.

Moreover, the discharging section of the fan casing is connected to a location that does not communicate with the surrounding of the outer casing of the unit battery 20.

Thus, a series of passages formed by the connecting member 41, the passage forming member 4, and the connecting member 40 constitute an independent passage that does not communicate with the surrounding of the outer casing of the unit battery 20.

The heat conducting plate 5 is an example of a heat conducting member thermally connected at least to one of the outer casing or the electrode terminal 202 of the unit battery 20 constituting the respective battery stack 2 adjacent to each other.

In an example shown in FIG. 3, the heat conducting plate 5 includes a portion that directly or indirectly contacts the outer casing of the unit battery 20, and a cooled portion 50 that is in an opposite side of the contacting portion and exists in the fluid passage 42.

A single heat conducting plate 5 is interposed between the two unit batteries 20 adjoining in the stacking direction, and contacts to the outer casings of both unit batteries 20.

In other words, in a single battery stack 2, the unit battery 20 and the heat conducting plate 5 are disposed integrally and aligned alternately in the stacking direction.

Therefore, the heat conducting plate 5 includes a portion that is directly or indirectly sandwiched by the outer casings of the two unit batteries 20, and the cooled portion 50 that extends from the sandwiched portion towards the battery stack 2 side and penetrates the passage forming member 4 to exist in the fluid passage 42.

That is, by a portion that is supported in the passage forming member 4 as a boundary, the cooled portion 50 of the heat conducting plate 5 is positioned in one side of the boundary and exists in the fluid passages 42, while most of the heat conducting plate 5 on the other side of the boundary exists outside of the passage forming member 4.

Further, a fin 51 for heat radiation is disposed in the cooled portion 50 in order to enlarge a surface area for heat radiation.

A plurality of fins 51 are disposed in a single cooled portion 50, and have forms protruding from the surface of the cooled portion 50.

In such a heat conducting plate 5 with a configuration that being directly or indirectly connected to the outer casing of the unit battery 20 or the electrode terminals 202, it is possible to transfer heat between them.

Therefore, heat of the unit battery 20 released through the outer casing or the electrode terminal 202 is transferred to the heat conducting plate 5.

Furthermore, the heat is transferred to the cooled portion 50 transferring through the heat conducting plate 5 itself, and released from the cooled portion 50 or the fins 51 to air flowing in the fluid passage 42 in a direction perpendicular to the stacking direction and aligning direction of the battery stack 2.

The passage forming member 4 demarcates the fluid passage 42 as an independent passage from the surrounding of the outer casing of the unit battery 20.

The passage forming member 4 is a wall that demarcates the fluid passage 42, and has the partition walls for supporting the penetrating portions of the heat conducting plates 5.

In addition, the passage forming member 4 is disposed between the adjoining battery stacks 2, and supports the cooled portions 50 of the heat conducting plates 5 included in the two battery stacks 2.

A single passage forming member 4 includes two partition walls extending along each of the battery stacks 2 in the stacking direction.

The two partition walls are disposed facing each other with an interval therebetween, and the fluid passage 42 is disposed between these partition walls.

A plurality of cooled portions 50 penetrate each of the partition walls that are in an opposing relationship, and are positioned in the fluid passage 42 so as to protrude toward each other.

The passage forming member 4 is a cylindrical body having both ends opened, and has the fluid passage 42 inside the cylindrical body extending in a direction perpendicular to the stacking direction and the aligning direction of the battery stacks 2.

The cylindrical body can be formed by combining a plurality of components.

Thus, according to configuring the passage forming member 4 by the plurality of components, it is possible to set its positioning easily in a process of stacking the unit batteries 20.

In the example shown in FIG. 3, the passage forming member 4 is formed by combining a lid member 43 positioned at a top, a bottom member 45 positioned at the bottom, a plurality of intermediate members 44, which function as partition walls, combined with the lid member 43 and the bottom member 45 in the stacking direction.

The lid member 43 has a form integrally including a top plate that constitutes a ceiling of the passage forming member 4, and two protrusions 430 protruding downwardly from the top plate and extending along the fluid passage 42 in a fluid flow direction.

The lengths of the ceiling in the aligning direction of the battery stack 2 and the fluid flow direction are the same lengths as a top surface of the passage forming member 4.

The two protrusions 430 protrude from a bottom surface of the top plate in the aligning direction of the battery stack 2 with a predetermined interval therebetween so as to correspond to positions of grooves 440 formed in the intermediate members 44 below to be combined.

The protruding length of the protrusion 430 is set to be less than or equivalent to the groove depth of the groove portion 440 to be fitted.

Moreover, a fitting structure between the protrusion 430 and the groove 440 constitutes a sealing portion in a coupling between the lid member 43 and the intermediate member 44 below because it is configured in a dimensional relationship that an adhesion between them to become high.

Thereby, even when a gap is formed between the bottom surface of the lid member 43 and an upper surface of the intermediate member 44 below, it is possible to prevent the fluid flowing through the fluid passage 42 from leaking to the outside of the passage forming member 4 by the fitting between the protrusion 430 and the groove 440.

The bottom member 45 has a form integrally including a bottom plate that constitutes a bottom of the passage forming member 4, and two grooves 450 that are recesses recessed from a top surface extending in the fluid flow direction of the fluid passage 42.

Thus, the bottom member 45 has a plate-like appearance.

The lengths of bottom plate in the aligning direction of the battery stack 2 and the fluid flow direction are the same lengths as a bottom surface of the passage forming member 4.

The two grooves 450 are formed in the aligning direction of the battery stack 2 with a predetermined interval therebetween so as to correspond to positions of protrusion 441 formed in the intermediate members 44 above to be combined.

The groove depth of the groove 450 is set to be equal to or longer than the protruding length of the protrusion 441 to be fitted.

Moreover, a fitting structure between the protrusion 441 and the groove 450 constitutes a sealing portion in a coupling between the bottom member 45 and the intermediate member 44 above because it is configured in a dimensional relationship that an adhesion between them to become high.

Thereby, even when a gap is formed between the top surface of the bottom member 45 and a bottom surface of the intermediate member 44 above, it is possible to prevent the fluid flowing through the fluid passage 42 from leaking to the outside of the passage forming member 4 by the fitting between the protrusion 441 and the groove 450.

The intermediate member 44 has a form integrally including a cylindrical portion 442 having an axis along a stacking direction, two grooves 440 recessed from a top surface of the cylindrical portion 442 extending in the fluid flow direction of the fluid passage 42, and two protrusions 441 protruding from a lower surface and extending along the fluid passage 42.

The two grooves 440 are formed in the aligning direction of the battery stack 2 with a predetermined interval therebetween so as to correspond to positions of protrusion 441 formed in the intermediate members 44 above to be combined.

The groove depth of the groove 440 is set to be equal to or longer than the protruding length of the protrusion 441 to be fitted therein.

The heat conducting plate 5 penetrates through the cylindrical portion 442.

That is, by a the cylindrical portion 442 as a boundary, the cooled portion 50 of the heat conducting plate 5 is positioned in one side of the boundary and exists in the fluid passages 42, while most of the heat conducting plate 5 on the other side of the boundary exists outside of the passage forming member 4.

Therefore, each heat conducting plate 5 is supported by the intermediate member 44 by penetrating the cylindrical portion 442 to be integrated with it.

The heat conducting plate 5 can be molded integrally with the passage forming member 4 by insert molding or the like, for example.

The heat conducting plate 5 and the cylindrical portion 442 can be manufactured and managed as a single component.

Moreover, a fitting structure between the protrusion 441 and the groove 440 constitutes a sealing portion in a coupling between the intermediate member 44 above and the intermediate member 44 below because it is configured in a dimensional relationship that an adhesion between them to become high.

Thereby, even when a gap is formed between the bottom surface of the intermediate member 44 above and the upper surface of the intermediate member 44 below, it is possible to prevent the fluid flowing through the fluid passage 42 from leaking to the outside of the passage forming member 4 by the fitting between the protrusion 441 and the groove 440.

The heat conducting plate 5 sandwiched between the unit batteries 20 adjoining in the vertical direction includes a terminal heat absorbing portion 52 that absorbs the heat generation of the electrode terminal 202.

The terminal heat absorbing portion 52 contacts to a portion of the electrode terminal 202 covered with laminate films, via the laminate films in the unit batteries 20 to which the heat conducting plate 5 adjoins and contacts in the stacking direction.

The terminal heat absorbing portion 52 contacts with a surface of the unit battery 20 positioned on an opposite side of a surface of the unit battery 20 where a majority of the heat conducting plate 5 contacts.

Therefore, the terminal heat absorbing portion 52 contacts the outer surface of the laminate film so as to press it, and a portion of the laminate film that is pressed by the terminal heat absorbing portion 52 contacts a portion of the electrode terminal 202 protruding outwardly from the main body portion 200.

The heat of the electrode terminal 202 is transferred to the terminal heat absorbing unit 52 through the laminate film, is conducted thermally to the heat conducting plate 5, and is discharged to the outside by the heat from the cooled portion 50 absorbed by the fluid.

As shown in FIGS. 4 and 5, the terminal heat absorbing portion 52 is composed of a piece of a strip cut and raised from a portion of the heat conducting plate 5.

A base portion of terminal heat absorbing section 52 is raised from a surface of the heat conducting plate 5 near the cooled portion 50, and a tip side thereof contacts to a portion covering the electrode terminals 202 in the sealing portion 201 around the main body portion 200 to sandwich the unit battery 20 with the heat conducting plate 5e.

With this configuration, the electrode terminal 202 is pressed.

Since the tip side of the terminal heat absorbing section 52 tries to return near the surface of the heat conducting plate 5, a force to press the electrode terminal 202 can be provided by the restoring force.

The single heat conducting plate 5 has at least two terminal heat absorbing portions 52.

That is, each heat conducting plate 5 presses at least two electrode terminals 202 in the adjoining unit batteries 20 over the laminate film.

With the above configuration, one of heat radiation paths in the unit battery 20 is constructed by the electrode terminal 202, the laminate film, and the terminal heat absorbing portion 52 being connected thermally.

Next, functions and effects that battery pack 1 of the first embodiment brings will be described.

The battery pack 1 includes the plurality of battery stacks 2, the fluid passage 42, which is a passage disposed between the battery stacks 2, where fluid for cooling the unit batteries 20 flows, and the fluid driver that circulates the fluid in the fluid passage 42.

The battery pack 1 includes the plurality of heat conducting plates 5 and the partition walls for supporting the heat conducting plates 5, as well as the passage forming member 4 that demarcates the fluid passage 42 as a passage independent from the surrounding of the outer casing of the unit battery 20.

The plurality of heat conducting plates 5 are thermally connected at least to one of the outer casing of the unit battery 20 constituting the respective battery stack 2 adjacent to each other or the electrode terminal 202, and portions thereof are respectively disposed so as to constitute the cooled portions 50 that exist in the fluid passage 42.

According to the present configuration, it is possible to separate spaces where the unit batteries 20 exist and the fluid passage 42 where the cooling fluid flows by the passage forming member 4.

Thus, even when gas leaks from the unit batteries 20 to the surroundings, for example, the gas can be prevented from being mixed in the fluid flowing through the fluid passage 42 and diffusing to other places.

Further, by supporting the plurality of heat conducting plates 5 extending from the battery stack 2 by the partition walls of the passage forming member 4, the resistance against vibration can be enhanced even in a situation where the unit battery 20 vibrates.

Thus, the battery pack 1 that suppresses gas from expanding when the gas is generated from the unit battery 20, while provides the fluid passage 42 having a function of supporting the unit battery 20 can be obtained.

Further, it is preferable that the heat conducting plate 5 be a member that is integrally molded in the passage forming member 4 so as to penetrate the partition wall of the passage forming member 4.

According to this, when forming a passage forming member by resin, the heat conducting plate 5 and the passage forming member 4 can be manufactured as an integral member by insert molding, for example.

Thereby, it is possible to reduce the number of components and component management processes.

Moreover, since the passage forming member 4 supports the heat conducting plates 5 by being molded integrally, it is possible to strengthen the supporting force, and it is possible to provide the battery pack 1 with improved resistance against vibration.

Furthermore, since an effect of suppressing the fluid from leaking from portions in the passage forming member 4 where the heat conducting plates 5 penetrate is high by adopting the integral molding, it is possible to provide the battery pack 1 that can maintain the quality of the battery cooling performance for a long time.

Further, since it does not require sealing parts such as a packing in order to measure the leakage of the fluid from the portions where the heat conducting plates 5 penetrate by adopting the integral molding, the quality of the battery cooling performance can be maintained longer at small number of components.

Moreover, the conducting plate 5 includes the terminal heat absorbing portion 52 that contacts to the portion of the electrode terminal 202 covered with the laminate films via the laminate films in the pouch cells adjoining in the stacking direction, and absorbs the heat generation of the electrode terminal 202.

According to this configuration, the terminal heat absorbing portion 52 can absorb the heat from the electrode terminal 202 that the temperature from which tends to become high in the unit batteries 20 constituting the battery stack 2.

Therefore, since the heat of portions that tend to be high temperature in the unit batteries 20 is moved onto the cooled portion 50 through a main body portion of the heat conducting plate 5, it is possible to increase the battery cooling performance of the unit battery 20.

Second Embodiment

In the second embodiment, another aspect according to the heat conducting plate will be described with reference to FIG. 6.

In FIG. 6, elements having the same configurations as the first embodiment are denoted by the same reference numerals, and have the same functions and effects.

Configurations, functions and effects not particularly described in the second embodiment are similar to those of the first embodiment.

Hereinafter, only points different from the first embodiment will be described.

Further, those having the same configurations as the first embodiment in the second embodiment are assumed to have the same functions and effects described in the first embodiment.

Since the unit battery 20 has a structure for effectively dissipating heat from the cooled portion 50, there is a tendency that the temperature of a portion distant from the cooled portion 50, which exists in the fluid passage 42, becomes higher.

Further, since the heat dissipation effect from the cooled portion 50 is larger closer to the upstream side of the fluid in the unit battery 20, there is a tendency that the temperature is higher at a portion closer to the downstream side of the fluid.

Thus, as shown in FIG. 6, among the four corners of the main body portion 200 viewed in a plane, the temperature of a first area 200a tends to be the lowest in the unit battery 20.

Then, the temperatures of a third area 200c and a second area 200b are higher in this order, and a fourth area 200d that is the farthest from the cooled portion 50 and positioned in the downstream side of the fluid becomes the highest in the temperature.

The first area 200a is a corner portion positioned in the upstream side of the fluid and positioned on the side closer to the cooled portion 50 among the four corners of the unit battery 20.

The second area 200b is a corner portion positioned in the upstream side of the fluid and positioned on the side farther from the cooled portion 50 among the four corners of the unit battery 20.

The third area 200c is a corner portion positioned in the downstream side of the fluid and positioned on the side closer to the cooled portion 50 among the four corners of the unit battery 20.

The fourth area 200d is a corner portion positioned in the downstream side of the fluid and positioned on the side farther from the cooled portion 50 among the four corners of the unit battery 20.

Therefore, a heat conducting plate 105 of the second embodiment includes a heat absorbing piece 152 that contacts with a surface of the unit battery 20 positioned on an opposite side of a surface of the unit battery 20 where a majority of the heat conducting plate 5, which is a main part thereof, contacts.

The heat absorbing piece 152 contacts with a predetermined portion in the unit battery 20, and absorbs the heat generated in the unit batteries 20 via the contacted portion.

As shown in FIG. 6, the heat absorbing piece 152 is composed of a strip having an L-shape in plan view cut and raised from a portion of the heat conducting plate 105.

The heat absorbing piece 152 has a planar shape including a base portion 152a raised from a surface of a portion of the heat conducting plate 105 positioned in the upstream side of the fluid near the cooled portion 50, a contacting portion 152c that contacts a surface of the unit battery 20, and a bent portion 152b that connects the base portion 152a and the contacting portion 152c.

The bent portion 152b is a portion that a rectangular portion extending from the base portion 152a along the aligning direction of the battery stack 2 away from the fluid passage 42 and the cooled section 50 bent at a right angle towards the contacting portion 152c.

Although the rectangular portion is not in contact with the unit battery 20, substantially the entire part of the contacting portion 152c contacts to the surface of the unit battery 20.

In other words, the contacting portion 152c contacts to a belt-shaped portion over the laminate film that communicates between the second area 200b and the fourth area 200d in the unit battery 20.

Therefore, the contacting portion 152c contacts to the belt-shaped portion where the temperature is higher than other portions in the main body portion 200 so as to press the outer surface of the laminate film.

The heat emitted from the belt-shaped portion of the unit battery 20 is transferred to the contacting portion 152c through the laminate film, then further transferred to the heat conducting plate 105 thermally conducting via the bent portion 152b and the base 152a, and is discharged to the outside by the heat from the cooled portion 50 absorbed by the fluid.

The heat absorbing piece 152 presses the belt-shaped portion by the contacting portion 152c contacting the belt-shaped portion that communicates the second area 200b and the fourth area 200d in the main body portion 200 and sandwiching the unit battery 20 with the heat conducting plate 105.

Since a tip side of the heat absorbing piece 152 tries to return near the surface of the heat conducting plate 105, a force to press the belt-shaped portion by the contacting portion 152c can be provided by the restoring force.

A single heat conducting plate 105 has at least one heat absorbing piece 152.

That is, each heat conducting plate 105 presses at least the belt-shaped portion in the adjoining unit batteries 20 over the laminate film.

With the above configuration, one of heat radiation paths in the unit battery 20 is constructed by the belt-shaped portion, the laminate film, and the heat absorbing piece 152 being connected thermally.

According to the second embodiment, the unit battery 20 is a pouch cell that includes an outer casing formed of laminated films.

The heat conducting plate 105 includes the heat absorbing piece 152 extending from the heat conducting plate 105.

The heat absorbing piece 152 is positioned on the downstream side of the fluid in the pouch cell adjoining in the stacking direction, contacts to a portion positioned away from the cooled portion 50 over the laminate film, and absorbs the heat generated in the pouch cell.

According to the present configuration, the heat absorbing piece 152 may absorb the heat from portions where the temperature tends to become high (e.g., the belt-shaped portion mentioned above) in the unit batteries 20 constituting the battery stack 2.

Therefore, since the heat of portions that tend to have a high temperature in the unit batteries 20 is transferred to the cooled portion 50 through a main body portion of the heat conducting plate 105, it is possible to increase the battery cooling performance of the unit battery 20.

In addition, the heat that has moved to the contacting portion 152c of the heat absorbing piece 152 is transferred to the base portion 152a via the bent portion 152b.

Since the base 152a is positioned in the upstream side of the fluid, and is close to the cooled portion 50, the heat transferred to the base portion 152a can be dissipated from the cooled portion 50 in portions that are most effectively cooled by the fluid.

Therefore, since the heat of portions that tend to have a high temperature in the unit batteries 20 is transferred efficiently to the cooled portion 50, it is possible to provide a battery pack where the high temperature portion can be efficiently cooled to improve the battery cooling performance.

Furthermore, according to the second embodiment, when the battery stack 2 vibrates due to some disturbance, it is possible to contribute to suppress the vibration from propagating or diffusing by the heat absorbing piece 152 of the heat conducting plate 105 that presses the pouch cell over the laminate film.

Third Embodiment

In the third embodiment, another aspect according to the heat conducting plate will be described with reference to FIG. 7.

In FIG. 7, elements having the same configurations as the first embodiment are denoted by the same reference numerals, and have the same functions and effects.

Configurations, functions and effects not particularly described in the third embodiment are similar to those of the first embodiment.

Hereinafter, only points different from the first embodiment will be described.

Further, those having the same configurations as the first embodiment in the third embodiment have the same functions and effects described in the first embodiment.

A heat conducting plate 205 of the third embodiment is different from the cooled portion 50 of the first embodiment in a shape of a cooled portion 250 that exists in the fluid passage 42.

The cooled portion 250 has a shape that a surface area thereof in the downstream side is larger than a surface area in the upstream side of the fluid passage 42.

That is, the surface area of the upstream side portion exposed to the fluid passage 42 of the cooled portion 250 is smaller than that of the downstream side.

Moreover, the surface area of the portion exposed to the fluid passage 42 of the cooled portion 250 is preferred to be gradually increasing in direction from an upstream end toward a downstream end.

Specifically, the protruding length of the cooled portion 250 from the partition wall of the passage forming member 4 toward the fluid passage 42 is configured to gradually increase from the upstream end toward the downstream end.

According to the present configuration, a contacting area of the fluid flowing through the fluid passage 42 the cooled portion 250 becomes larger in the downstream side than in the upstream side.

Further, since the contacting area of the fluid to the cooled portion 250 in the upstream side becomes small, heat amount at the upstream side is suppressed from being absorbed.

Thus, by suppressing the heat amount of the fluid flowing through the fluid passage 42 from being absorbed at the upstream side to suppress the temperature from rising, and by increasing the contacting area in the downstream side, it is possible to secure the amount of heat absorption from the cooled portion 250 even in the downstream side where the fluid temperature is increased by the progress of the heat absorption.

Therefore, in each unit battery 20, a uniform cooling in the fluid flow direction is secured, and it is possible to provide a battery pack where the temperature difference between the upstream side and the downstream side can be controlled.

Fourth Embodiment

In the fourth embodiment, another aspect according to the heat conducting plate will be described with reference to FIG. 8.

In FIG. 8, elements having the same configurations as the first embodiment are denoted by the same reference numerals, and have the same functions and effects.

Configurations, functions and effects not particularly described in the fourth embodiment are similar to those of the first embodiment.

Hereinafter, only points different from the first embodiment will be described.

Further, those having the same configurations as the first embodiment in the fourth embodiment are assumed to have the same functions and effects described in the first embodiment.

A heat conducting plate 305 of the fourth embodiment is different from the cooled portion 50 of the first embodiment in a shape of a cooled portion 350 that exists in the fluid passage 42.

The cooled portion 350 has a shape that a surface area thereof in the downstream side is larger than a surface area in the upstream side of the fluid passage 42.

That is, the surface area of the upstream side portion exposed to the fluid passage 42 of the cooled portion 350 is smaller than that of the downstream side.

Additionally, the cooled portion 350 includes relief portions where through holes are formed in a portion positioned in the upstream side of the fluid flow direction, and no relief portions are disposed in a portion in the downstream side.

Therefore, a surface area of the cooled portion 350 in the upstream side is configured to be smaller than that of the downstream side by an amount equivalent to a total surface area of the through holes.

The through holes may be constituted by a plurality of slits aligned in the fluid flow direction, for example.

According to the present configuration, a contacting area of the fluid flowing through the fluid passage 42 to the cooled portion 350 becomes larger in the downstream side than the upstream side by an amount equivalent to the total surface area of the through holes.

Further, since the contacting area of the fluid to the cooled portion 350 in the upstream side becomes small, heat amount at the upstream side is suppressed from being absorbed.

Thus, by suppressing the heat amount of the fluid flowing through the fluid passage 42 from being absorbed at the upstream side to suppress the temperature from rising, and by increasing the contacting area in the downstream side, it is possible to secure the amount of heat absorption from the cooled portion 350 even in the downstream side where the fluid temperature is increased by the progress of the heat absorption.

Therefore, as in the third embodiment, in each unit battery 20, a uniform cooling in the fluid flow direction is secured, and it is possible to provide a battery pack that the temperature difference between the upstream side and the downstream side can be controlled.

Fifth Embodiment

In the fifth embodiment, another aspect according to the heat conducting plate will be described with reference to FIG. 9.

Figure 9:
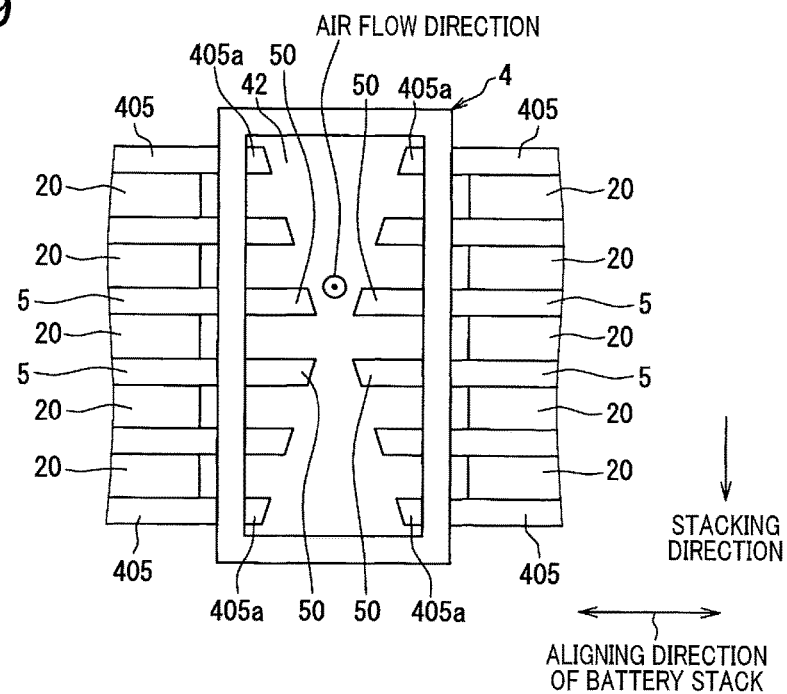
FIG. 9 shows a plan view of a relationship between a heat conducting plate and a cooling air passage of a fifth embodiment.

In FIG. 9, elements having the same configurations as the first embodiment are denoted by the same reference numerals, and have the same functions and effects.

Configurations, functions and effects not particularly described in the fifth embodiment are similar to those of the first embodiment.

Hereinafter, only points different from the first embodiment will be described.

Further, those having the same configurations as the first embodiment in the fifth embodiment are assumed to have the same functions and effects described in the first embodiment.

In the fifth embodiment, a plurality of heat conducting plates (hereinafter, also referred to as a heat conducting member group in the stacking direction) are aligned in the stacking direction, and the lengths of the cooled portions that protrude from the partition wall of the passage forming member 4 to the fluid passage 42 are configured to be non-uniform.

The heat conducting member group in the stacking direction is disposed so that surface areas of the cooled portions become larger toward a central part than both end parts in the stacking direction.

That is, the surface areas of a plurality of heat conducting plates aligned in the stacking direction exposed to the fluid passage 42 at both end parts in the stacking direction are smaller than that of the central part.

Specifically, the heat conducting plate 5 disposed in the central part has the cooled portion 50 with the longest length protruding from the partition wall of the passage forming member 4 to the fluid passage 42 among the other heat conducting plates.

Further, heat conducting plates 405 positioned at both end parts have cooled portions 405a with the shortest lengths protruding from the partition wall of the passage forming member 4 to the fluid passage 42 among the other heat conducting plates.

Furthermore, it is preferred that the surface areas or protruding lengths of the plurality of the cooled portions aligned in the stacking direction of the heat conducting member group in the stacking direction are configured to decrease gradually from the central part towards the both end parts.

In other words, the plurality of the cooled portions aligned in the stacking direction of the heat conducting member group in the stacking direction are disposed so as to be denser in the central part than the both end parts.

That is, the surface area of the cooled portion per unit volume in the central part is configured to be larger than the surface area of the cooling part per unit volume in each of the end parts.

According to the fifth embodiment, each of the heat conducting members constituting the heat conducting member group includes the cooled portions 50, 405a that exist in the fluid passage 42 and are cooled by the fluid.

The cooled portions 50, 405a included in the heat conducting member group are disposed so that the surface area thereof in the central part in the stacking direction becomes larger than those in the end parts.

In each battery stack 2, the temperature of the unit battery 20 positioned in the central part in the stacking direction tends to become higher than those in the end parts.

This is because the heat is easily confined to the unit battery 20 in the central part due to the influence of the heat generated from the other unit batteries 20 in the periphery in addition to self-heat generation, and thus the heat dissipation is lower than the unit batteries 20 positioned at both end parts.

Therefore, according to battery pack of the fifth embodiment, the contacting area of the fluid flowing through the fluid passage 42 to the cooled portions at the central part becomes larger than at the both end parts in the stacking direction (top and bottom parts).

Since the amount of the heat absorption of the fluid from the cooled portion 250 increases in the central part, it is possible to actively cool the battery unit battery 20 positioned in the central part where the temperature tends to become high.

Moreover, since the heat amount of the fluid at the both end parts side is suppressed from being absorbed compared to the central part side, the temperature of the plurality of unit batteries 20 aligned in the stacking direction can be close to be even.

Further, since a flow resistance of the fluid decreases in the central part in the stacking direction more than in the both end parts, it is possible to increase a flow velocity near the central part.

With this flow velocity increasing action, the temperature of the plurality of unit batteries 20 aligned in the stacking direction can be close to be even.

Therefore, in each battery stack 2, a uniform cooling in the stacking direction is secured, and it is possible to provide a battery pack that the temperature difference between unit batteries can be controlled.

Sixth Embodiment

In the sixth embodiment, another aspect according to the heat conducting plate will be described with reference to FIG. 10.

Figure 10:
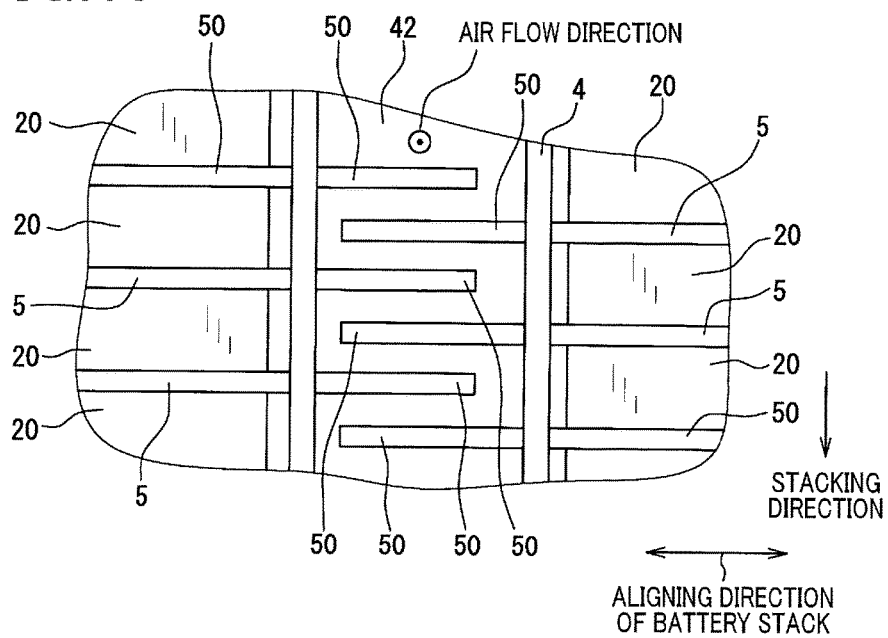
FIG. 10 shows a partially enlarged plan view of a relationship between a heat conducting plate and a cooling air passage of a sixth embodiment.

In FIG. 10, elements having the same configurations as the first embodiment are denoted by the same reference numerals, and have the same functions and effects.

Configurations, functions and effects not particularly described in the sixth embodiment are similar to those of the first embodiment.

Hereinafter, only points different from the first embodiment will be described.

Further, those having the same configurations as the first embodiment in the sixth embodiment are assumed to have the same functions and effects described in the first embodiment.

In the sixth embodiment, a point that the cooled portions 50 protruding from each adjoining battery stack 2 to the fluid passage 42 are disposed so as to overlap in the stacking direction is different from the first embodiment.

Thus, the cooled portions 50 according to the sixth embodiment are provided more densely in the fluid passage 42 than the cooled portions 50 of the first embodiment.

Therefore, according to the battery pack of the sixth embodiment, since a contacting area of the fluid flowing through the fluid passage 42 to the cooled sections 50 is increased, the battery cooling performance can be improved.

Seventh Embodiment

In the seventh embodiment, another aspect according to the heat conducting plate will be described with reference to FIG. 11.

Figure 11:
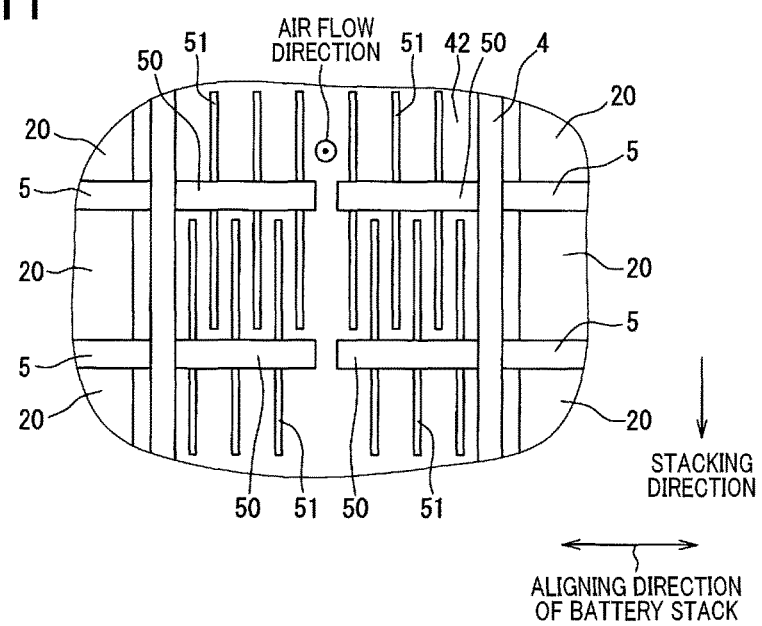
FIG. 11 shows a partially enlarged plan view of a relationship between a heat conducting plate and a cooling air passage of a seventh embodiment.

In FIG. 11, elements having the same configurations as the first embodiment are denoted by the same reference numerals, and have the same functions and effects.

Configurations, functions and effects not particularly described in the seventh embodiment are similar to those of the first embodiment.

Hereinafter, only points different from the first embodiment will be described.

Further, those having the same configurations in the seventh embodiment as the first embodiment have the same functions and effects described in the first embodiment.

In the seventh embodiment, a location where fins 51 protruding from the cooled portion 50 are disposed so as to overlap in the aligning direction of the battery stack 2 is different from the first embodiment.

Thus, the cooled portions 50 and the fins 51 according to the seventh embodiment are provided more densely in the fluid passage 42 than the cooled portions 50 and the fins 51 of the first embodiment.

Therefore, according to the battery pack of the seventh embodiment, since a contacting area of the fluid flowing through the fluid passage 42 to the cooled sections 50 and the fins 51 is increased, the battery cooling performance can be improved.

Eighth Embodiment

In the eighth embodiment, another aspect according to the passage forming member will be described with reference to FIG. 12.

Figure 12:
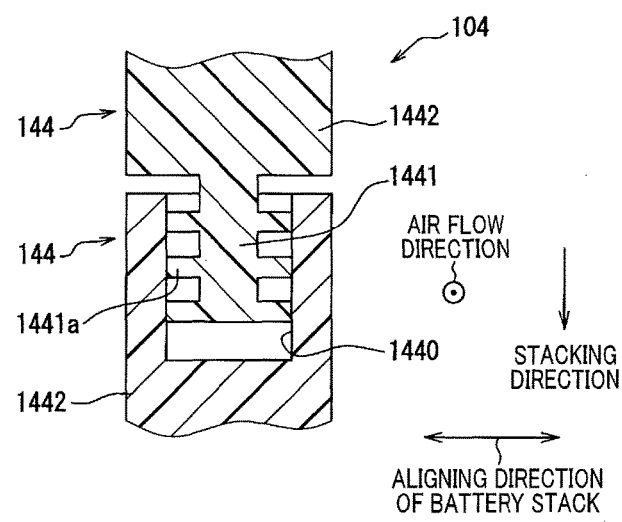
FIG. 12 shows a partially enlarged sectional view of a seal structure for a passage forming member in an eighth embodiment.

In FIG. 12, elements having the same configurations as the first embodiment are denoted by the same reference numerals, and have the same functions and effects.

Configurations, functions and effects not particularly described in the eighth embodiment are similar to those of the first embodiment.

Hereinafter, only points different from the first embodiment will be described.

Further, those having the same configurations as the first embodiment in the eighth embodiment are assumed to have the same functions and effects described in the first embodiment.

In the eighth embodiment, a seal structure for the passage forming member 104 is different from the first embodiment.

This seal structure may be applied to fitting structures of each part in the passage forming member 104.

The fitting structures are a fitting structure between the protrusions 441 of the lid member 43 and the grooves 440 of the intermediate member 44, a fitting structure between the protrusions 441 and the grooves 440 of the intermediate members 44, and a fitting structure between the protrusions 441 of the intermediate member 44 and the grooves 440 of the bottom member 45.

As an example, as shown in FIG. 12, a fitting structure between a protrusion 1441 of an intermediate member 144 and a groove 1440 of the intermediate member 144 will be described.

The protrusion 1441 includes three ribs 1441*a* respectively protruding in the aligning direction of the battery stack 2 from both sides for sealing.

The ribs 1441*a* are protruded at intervals of a predetermined pitch in the stacking direction.

In a condition where the protrusions 1441 and the groove 1440 are fitted, the ribs 1441*a* are disposed so as tips thereof abut an inner wall of the groove 1440 extending in the stacking direction.

Further, the ribs 1441*a*, like the protrusion 1441, are shaped to extend in the flow direction of the fluid flowing through the fluid passage 42, and disposed so as to contact the inner wall of the groove 1440 throughout the fluid flow direction length of the passage forming member 104.

Thus, two rows in the aligning direction of the battery stack 2 of three sealing portions aligned in the stacking direction are formed in the groove 1440 of the passage forming member 104, and the sealing portions are disposed in the entire fluid flow direction length.

Thereby, the sealing portions for preventing the fluid flowing through the fluid passage 42 from leaking to the outside are disposed to fitting portions between the members to be combined to form the passage forming member 104.

The fitting structure of the ribs 1441*a* and protrusion 1441 with the groove 1440 is configured so that dimensional relationships between them to be highly tight contact.

Therefore, the fitting structure constitutes a sealing portion of a labyrinth type in connecting the intermediate member 144 above and the intermediate member 144 below.

Thereby, even when a gap is formed between the intermediate member 144 above and the intermediate member 144 below, it is possible to prevent the fluid flowing through the fluid passage 42 from leaking to the outside of the passage forming member 104 by the fitting between the ribs 1441*a* and protrusion 1441 with the groove 1440.

Ninth Embodiment

In the ninth embodiment, another aspect according to the passage forming member will be described with reference to FIG. 13.

Figure 13:
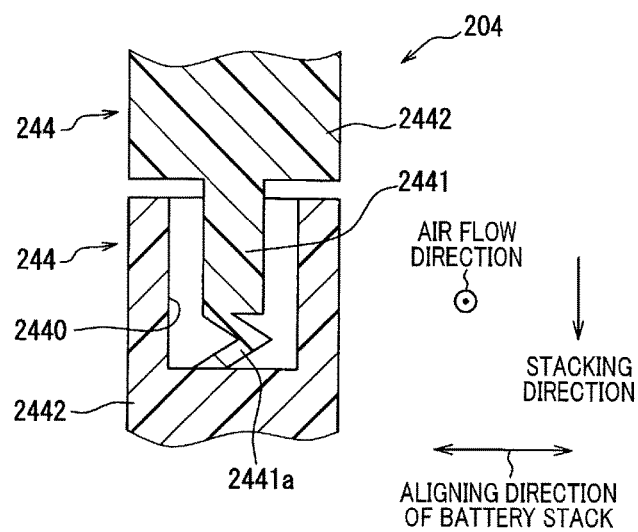
FIG. 13 shows a partially enlarged sectional view of a seal structure for a passage forming member in a ninth embodiment.

In FIG. 13, elements having the same configurations as the first embodiment are denoted by the same reference numerals, and have the same functions and effects.

Configurations, functions and effects not particularly described in the ninth embodiment are similar to those of the first embodiment.

Hereinafter, only points different from the first embodiment will be described.

Further, those having the same configurations as the first embodiment in the ninth embodiment are assumed to have the same functions and effects described in the first embodiment.

In the ninth embodiment, a seal structure for the passage forming member 204 is different from the first embodiment.

This seal structure, as well as described in the eighth embodiment, may be applied to fitting structures of each part in the passage forming member 204.

As an example, as shown in FIG. 13, a fitting structure between a protrusion 2441 of an intermediate member 244 and a groove 2440 of the intermediate member 244 will be described.

The protrusion 2441 includes a rib 2441*a* protruding from tip end face of the protrusion 2441 in the stacking direction having a vertical cross-sectional shape of a serpentine or zig-zag.

In a condition where the protrusion 2441 and the groove 2440 are fitted, the rib 2441*a* is disposed so as a tip thereof contacts a bottom surface of the groove 2440.

Since the rib 2441*a* has the serpentine or zig-zag-shaped vertical sectional shape, as shown in FIG. 13, the rib 2441*a* includes a flexibility that can stretch in response to compressive force acting in the stacking direction.

Thus, in the fitting condition of the protrusion 2441 and the groove 2440, rib 2441*a* has the flexibility that can closely contact with the bottom of the groove 2440 in a condition where being contracted in the stacking direction than in a condition where being natural length.

Further, the rib 2441*a* has a shape extending in the flow direction of the fluid flowing through the fluid passage 42 like the protrusion 2441, the rib 2441*a* is disposed so as to abut against the bottom surface of the groove 2440 throughout the fluid flow direction length of the passage forming member 204.

Thus, the sealing portion is disposed to the groove 2440 of the passage forming member 204 over the entire fluid flow direction length.

Thereby, the sealing portions for preventing the fluid flowing through the fluid passage 42 from leaking to the outside are disposed to a fitting portion between the members to be combined to form the passage forming member 204.

The fitting structure of the protrusion 2441 and the groove 2440 is configured so that the rib 2441*a* and the bottom surface of the groove 2440 are in contact with each other.

Therefore, the fitting structure constitutes a sealing portion of a spring type in connecting the intermediate member 244 above and the intermediate member 244 below.

Thereby, even when a gap is formed between the intermediate member 244 above and the intermediate member 244 below, it is possible to prevent the fluid flowing through the fluid passage 42 from leaking to the outside of the passage forming member 204 by the rib 2441*a* having flexibility contacting closely with the bottom surface of the groove 2440.

Tenth Embodiment

In the tenth embodiment, another aspect according to the battery pack will be described with reference to FIG. 14.

Figure 14:
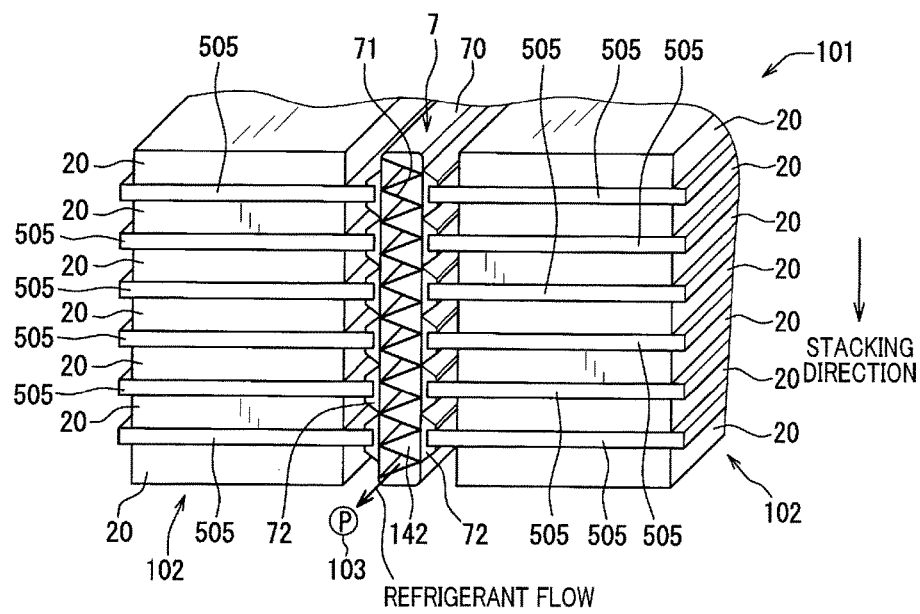
FIG. 14 shows a perspective view of a portion of the battery pack according to a tenth embodiment.

In FIG. 14, elements having the same configurations as the first embodiment are denoted by the same reference numerals, and have the same functions and effects.

Configurations, functions and effects not particularly described in the tenth embodiment are similar to those of the first embodiment.

Hereinafter, only points different from the first embodiment will be described.

Further, those having the same configurations as the first embodiment in the tenth embodiment are assumed to have the same functions and effects described in the first embodiment.

In a battery pack 101 of the tenth embodiment, a heat radiation path of the heat of the unit batteries 20 that is conducted through the heat conducting plate 505 thermally connected to at least one of the outer casing and the electrode terminal of the unit battery 20 is different from the battery pack 1 of the first embodiment.

In the battery pack 101, heat transferred to the heat conducting plate 505 exchanges heat with refrigerant flowing in the fluid passage 142 disposed in a heat exchanger 7 through the connecting member 72.

Water, a refrigerant such as a fluorine-based medium may be used as the refrigerant flowing through the fluid passage 142, for example.

The refrigerant, for example, flows through the fluid passage 142 by a fluid driver such as a pump 103.

The heat conducting plate 505 is an example of a heat conducting member thermally connected at least to one of the outer casing or the electrode terminal of the unit battery 20 constituting the respective battery stack 102 adjacent to each other.

As shown in FIG. 14, the heat exchanger 7 is disposed between the battery stacks 102 that are adjoining with intervals.

The heat exchanger 7 includes a cylindrical body 70 that forms a fluid passage 142 extending in a refrigerant flow direction, a corrugated inner fin 71 that contacts with an inner wall inside the cylindrical body 70, and the connecting member 72 disposed so as to contact an outer wall of the cylindrical body 70 for connecting the heat conducting plate 505 and the cylindrical body 70.

The cylindrical body 70 and the inner fin 71 are disposed so as to extend across the fluid flow direction length of the fluid passage 142, and are made of a material having thermal conductivity, such as aluminum or an aluminum alloy.

A plurality of heat conducting plates 505 extending from the battery stacks 102 positioned on both sides are connected to the cylindrical body 70 by a plurality of connecting members 72 disposed on both side walls of the cylindrical body 70.

The connecting member 72 is formed of a material having flexibility and thermal conductivity.

The connecting member 72 may be configured as a container body having a flexibility including grease therein, or grease having high thermal conductivity formed into a solid (e.g., jelly-like), for example.

With the above configuration, one of heat radiation paths in the battery pack 101 is constructed by the unit batteries 20, the heat conducting plates 505, the connecting members 72, the cylindrical body 70, and the inner fin 71 being connected thermally.

The battery pack 101 includes a plurality of heat conducting members thermally connected at least to one of the outer casings or the electrode terminals of the plurality of unit batteries 20, the heat exchanger 7 that forms the fluid passage 142 therein, and the connecting members 72 that thermally connect the heat exchanger 7 and the heat conduction members.

The connecting member 72 has flexibility and thermal conductivity.

According to the present configuration, it is possible to separate spaces where the unit batteries 20 exist and the fluid passage 142 where the cooling fluid circulates by the heat exchanger 7.

Thus, even when gas leaks from the unit batteries 20 to the surroundings, for example, the gas can be prevented from being mixed in the fluid flowing through the fluid passage 142 and diffusing to other places.

Further, by supporting the plurality of heat conducting plates 505 extending from the battery stack 2 by the connecting members 72, the resistance against vibration can be enhanced even in a situation where the unit battery 20 vibrates.

Thus, the battery pack 1 that suppresses gas from expanding when the gas is generated from the unit battery 20, while provides the fluid passage 142 having a function of supporting the unit battery 20 can be obtained.

Other Embodiments

Although the preferred embodiments of the present disclosure are described in the embodiments described above, the present disclosure is not limited in any way to the embodiments described above, and may be implemented in various modifications without departing from the scope of the present disclosure.

The structures of the embodiments described above are simply examples, and the scopes of the present disclosure are not intended to be limited to the scopes of the description.

The scopes of the present disclosure are indicated by appended claims, and are intended to include any modifications within the scopes and meanings equivalent to the description of the scopes of the claims.

In the foregoing embodiment, when the heat conducting plate 5 contacts indirectly with the outer casing of the unit battery 20, solids such as a sheet, grease or other members having a thermal conductivity may be interposed between the heat conducting plate 5 and the outer casing of the unit battery 20, for example.

Further, when the heat conducting plate 5 contacts indirectly with the electrode terminal 202 of the unit battery 20, the heat conducting plate 5 and the electrode terminal 202 are connected with a member having electrical insulating properties and thermal conductivity, for example.

According to such a configuration, the heat conducting plate 5 is thermally connected at least to one of the outer casing or the electrode terminal 202 of the unit battery 20.

The heat conducting plate 5 exemplified in the above embodiments can be configured as an integral member with the passage forming member 4 by being integrally molded with the passage forming member 4.

The heat conducting plate 5 may be supported by the passage forming member 4 by a configuration other than the above configuration.

For example, the heat conducting plate 5 may be supported with a configuration that constitutes the passage forming member 4 by combining a plurality of components in the stacking direction, and a part of the heat conducting plate 5 is interposed between the combined components so as to sandwich the heat conducting plate 5.

Even with this configuration, the heat conducting plate 5 may be assumed to be supported in a form such as to penetrate the partition wall of the passage forming member 4.

The heat conducting member exemplified in the above embodiments may be formed integrally with the unit battery.

That is, the heat conducting member and the unit battery cell are a single component, and the heat conducting member may be configured as a part of the unit battery.

In the foregoing embodiments, a plurality of unit batteries 20 constituting the battery pack 1, 101 may be formed into the flat-rectangular-shaped body of which the outer peripheral surface is covered by the outer casing made of aluminum, an aluminum alloy or the like, for example.

In the foregoing embodiments, the fluid flowing through the fluid passage may circulate in a closed circuit.

In this case, the circuit may be provided with a heat exchanger for heat dissipation that can dissipate heat of the fluid to the outside.

The positions of the electrode terminals or the electrode tabs protruding from the unit batteries 20 are not limited to the positions described in the foregoing embodiments.

What is claimed is:

1. A battery pack comprising:
   a plurality of battery stacks integrated by stacking a plurality of unit batteries;
   a fluid passage only disposed between separate and adjacent battery stacks, the fluid passage extending in a stacking direction of the plurality of batteries, where fluid flows for cooling the plurality of unit batteries, the battery stacks disposed adjacent to each other in an aligning direction perpendicular to the stacking direction;
   a fluid driver for circulating the fluid in the fluid passage;
   a heat conducting member group including a plurality of heat conducting members each thermally connected to at least one of an outer casing or an electrode terminal of one of the plurality of unit batteries, the plurality of heat conducting members being aligned in the stacking direction;
   a passage forming member that demarcates the fluid passage as an independent passage from an area near the outer casing of the unit batteries, and includes a partition wall for supporting the heat conducting members;
   a plurality of cooled parts of the plurality of heat conducting members that project into the fluid passage, surface areas of individual cooled parts in a central part of the heat conducting member group in the stacking direction being larger than surface areas of individual cooled parts in ends of the heat conducting member group in the stacking direction, and each cooled part having a greater surface area at a downstream end thereof than an upstream end thereof relative to the fluid flow, all of the cooled parts protruding from a same battery stack overlapping in the fluid passage in the stacking direction; and
   fins protruding from the cooled parts that overlap in the aligning direction.

2. The battery pack according to claim 1, wherein,
   each of the plurality of heat conducting members is integrally molded with the passage forming member so as to penetrate the partition wall.

3. The battery pack according to claim 1, wherein,
   each unit battery is a pouch cell with its outer casing formed of laminate films;
   heat conducting members are stacked between the pouch cells and are heat conducting plates that constitute the battery stack together with the pouch cells; and
   the heat conducting plates each include a terminal heat absorber that absorbs heat generated by the electrode terminal by contacting the electrode terminal in an area covered with the laminate films via the laminate films in the pouch cells adjoining in the stacking direction.

4. The battery pack according to claim 1, wherein,
   each unit battery is a pouch cell with its outer casing formed of laminate films;
   heat conducting members are stacked between the pouch cells and are heat conducting plates that constitute the battery stack together with the pouch cells; and
   each heat conducting plate includes a heat absorbing piece that extends therefrom, and the heat absorbing piece contacts the pouch cell in an area positioned away from the cooled part and in a downstream half of the pouch cell relative to the fluid flow, the heat absorbing piece contacting the pouch cell via the laminate films to absorb heat generated in the pouch cell.

5. The battery pack according to claim 1, wherein,
   the passage forming member is formed by combining a plurality of members in the stacking direction; and
   sealers for preventing the fluid flowing through the fluid passage from leaking to outside are disposed to fitters between the plurality of members to be combined.

* * * * *